United States Patent [19]
Ono

[11] Patent Number: 6,061,151
[45] Date of Patent: May 9, 2000

[54] IMAGE PROCESSING METHOD AND APPARATUS

[75] Inventor: Takashi Ono, Yokohama, Japan

[73] Assignee: Canon Kabushiki Kaisha, Tokyo, Japan

[21] Appl. No.: 08/803,428

[22] Filed: Feb. 20, 1997

[30]     Foreign Application Priority Data

Feb. 21, 1996  [JP]  Japan ..................................... 8-033630
Feb. 13, 1997  [JP]  Japan ..................................... 9-029280

[51] Int. Cl.$^7$ ................................................. H04N 1/40
[52] U.S. Cl. ........................... 358/448; 382/254; 382/264; 382/269
[58] Field of Search ................................... 382/254, 264, 382/269, 266; 358/447, 448

[56]     References Cited

U.S. PATENT DOCUMENTS

| 5,117,294 | 5/1992 | Yano | 358/447 |
| 5,270,836 | 12/1993 | Kang | 358/448 |
| 5,650,858 | 7/1997 | Lund | 382/254 |

*Primary Examiner*—Thomas D. Lee
*Attorney, Agent, or Firm*—Fitzpatrick, Cella, Harper & Scinto

[57]     ABSTRACT

An image processing apparatus includes an input unit for inputting image data having a plurality of pixels and representing whether each pixel is a white/black pixel, and a processing unit for performing a smoothing process for the image data to convert the input data into image data having a higher resolution than the input image data. The processing unit performs the smoothing process by performing interpolation processing for white pixels of the input image data.

15 Claims, 6 Drawing Sheets

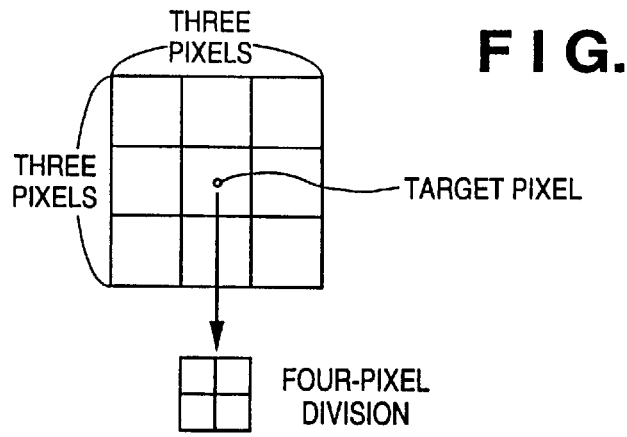
FIG. 2
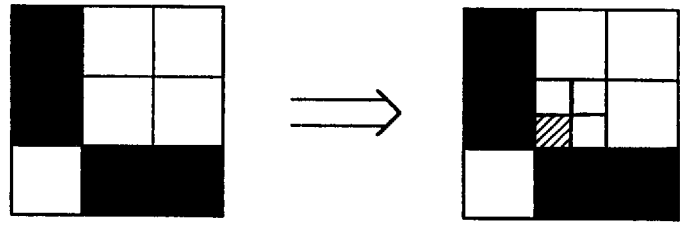
FIG. 3A
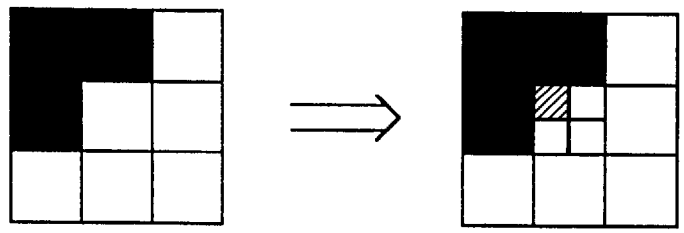
FIG. 3B
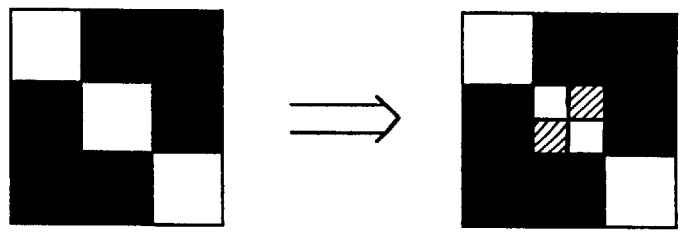
FIG. 3C
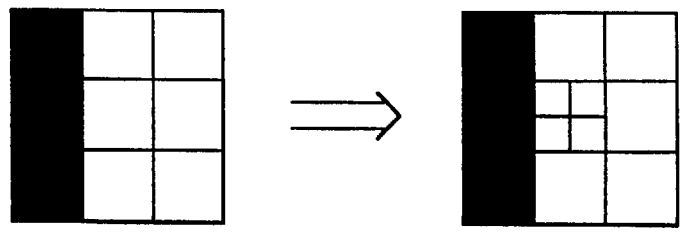
FIG. 3D
NO PROCESSING
 : PIXEL TO BE CONVERTED INTO BLACK PIXEL

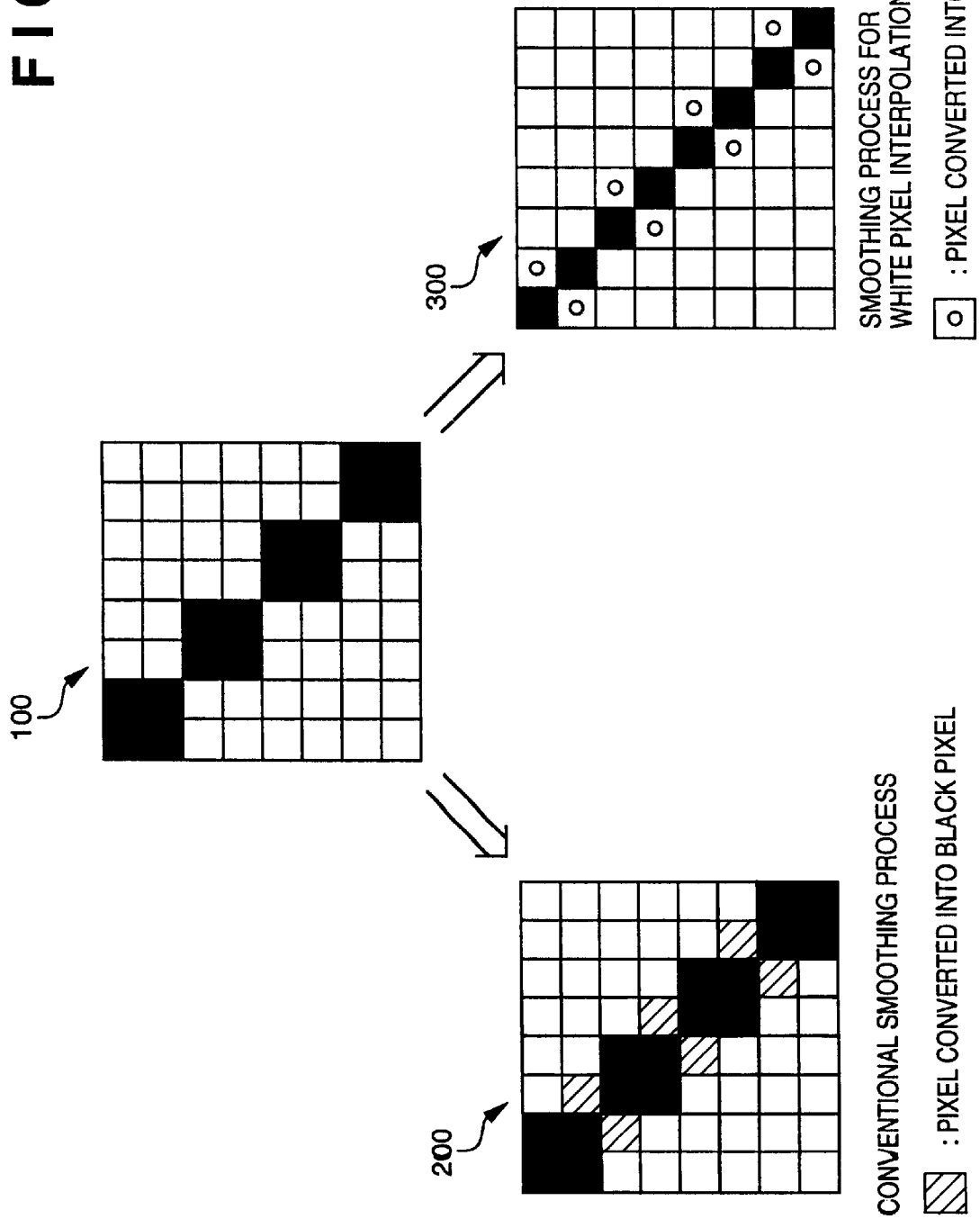

IMAGE PROCESSING METHOD AND APPARATUS

BACKGROUND OF THE INVENTION

1. Field of the Invention

The present invention relates to an image processing method and apparatus and, more particularly, to an image processing method and apparatus which performs smoothing of a contour portion of an image.

2. Description of the Related Art

Printer apparatuses and facsimile apparatuses having printing devices for printing images with resolutions higher than those of input image data have are known. A smoothing technique is known, in which when the resolution of input image data is to be converted in accordance with the resolution of the printing device of such an apparatus, the pseudo-resolution is increased by interpolating the contour of an image. This smoothing technique is used to smooth the contour of an image by interpolating black pixels with respect to a contour portion.

If, however, the above conventional smoothing technique is used for ink-jet printer, since an ink blurs on a printing paper sheet, a smoothing process of interpolating black pixels results in an undesirable connection in an image, especially between thin lines. As a result, the image quality deteriorates.

In addition, since the number of black pixels printed increases upon interpolation, a larger amount of ink is consumed, resulting in an increase in the cost of running the apparatus.

SUMMARY OF THE INVENTION

The present invention has been made to eliminate the drawbacks of the above conventional technique, and has as its object to provide an image processing method and apparatus which can obtain a high-quality, smooth image without causing an undesirable connection between thin lines.

It is another object of the present invention to provide an image processing method and apparatus which can prevent an undesirable connection in an image by performing a smoothing process of interpolating white pixels.

It is still another object of the present invention to provide an image processing method and apparatus which can decrease the number of black pixels by interpolating white pixels, thereby preventing an undesirable connection in an image, and suppressing the consumption of ink.

It is still another object of the present invention to provide an image processing apparatus and method which can perform a smoothing process, while preventing an undesirable connection between thin lines with a simple arrangement using a conventional smoothing algorithm, by performing a smoothing process after image data is inverted (white pixels are inverted into black pixels and vice versa), and inverting again the resultant image data again after the smoothing process.

It is still another object of the present invention to provide an image processing method and apparatus which can prevent an undesirable connection between thin lines and can also smooth a contour portion of an image by using one smoothing circuit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a view showing how one pixel is divided into four sub-pixels;

FIGS. 3A to 3D are views showing an example of a smoothing process;

FIG. 4 is a view for explaining a conventional smoothing process and a smoothing process of interpolating white pixels in this embodiment;

DETAILED DESCRIPTION OF THE PREFERRED EMBODIMENTS

An embodiment of the present invention will be described in detail below with reference to the accompanying drawings.

The image processing method of the present invention can be mainly applied to an ink-jet printer apparatus, and a facsimile apparatus and a copying machine which include ink-jet printers.

This embodiment will be described below, taking a facsimile apparatus as an example.

Figure 1:
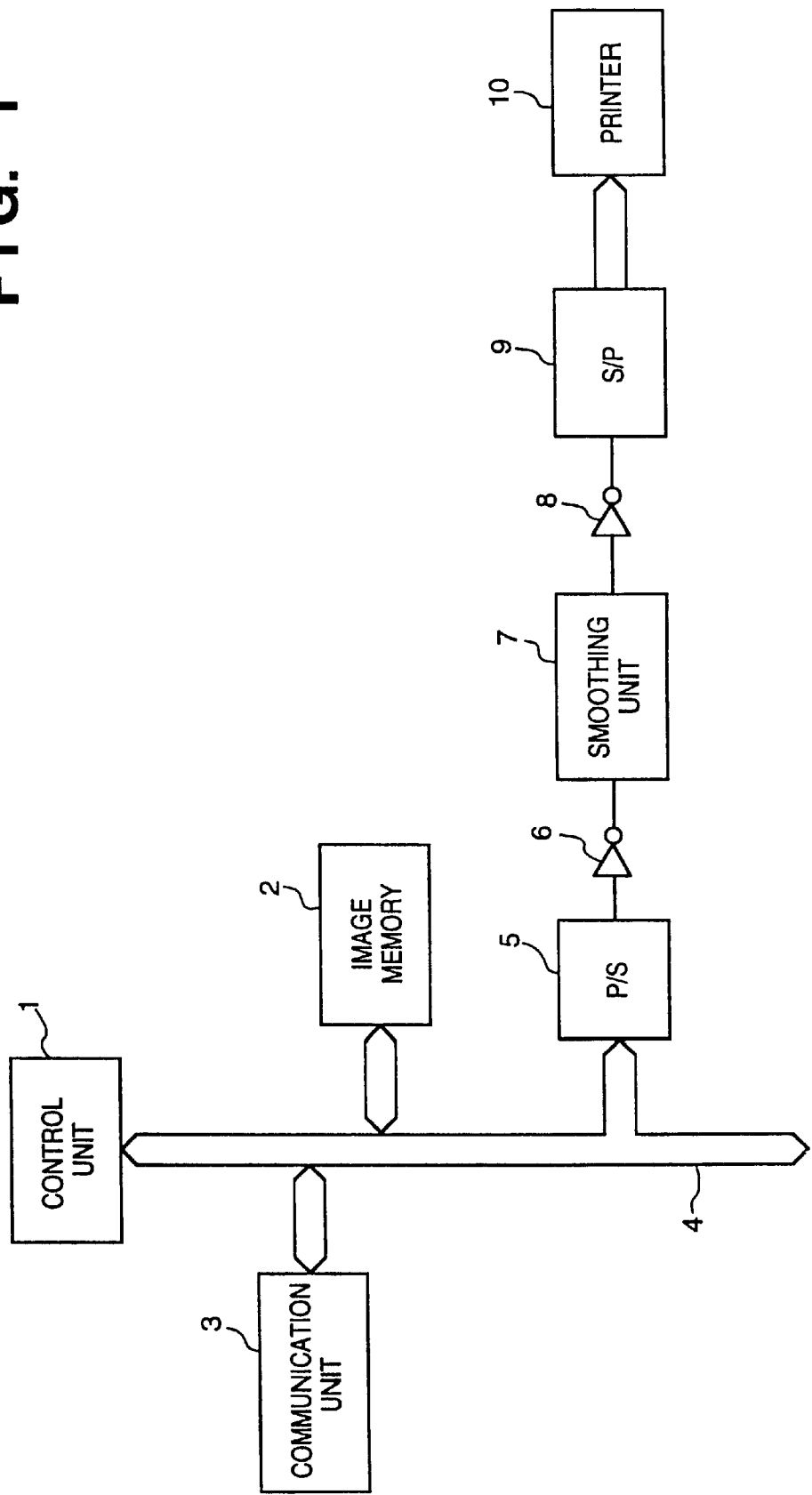
FIG. 1 is a block diagram showing the arrangement of the receiving/printing system of a facsimile apparatus according to an embodiment of the present invention.

FIG. 1 is a block diagram showing the arrangement of a facsimile apparatus according to an embodiment of the present invention, and more specifically, the arrangement of the receiving/printing system of the apparatus. Referring to FIG. 1, reference numeral 1 denotes a control unit for controlling the overall facsimile apparatus; 2, an image memory for storing image data; 3, a communication unit for performing facsimile communication according to a predetermined protocol; 4, a data bus; and 5, a parallel/serial converter for converting parallel data on the data bus 4 into serial data.

Reference numeral 6 denotes an inverter; 7, a smoothing unit for performing a smoothing process by interpolating black pixels; 8, an inverter; 9, a serial/parallel converter for converting serial data into parallel data; and 10, a printer for printing an image by the ink-jet scheme. Note that this printer is based on the ink-jet printing scheme using a resolution higher than that of a facsimile image complying with an ITU recommendation.

The resolution of a facsimile image complying with the ITU recommendation is 8 pels×3.85 lines/mm or 8 pels×7.7 lines/mm. The resolution of the printer 10 of this facsimile apparatus is set to 16 pels×15.4 lines/mm. Consider a case wherein an image of 8 pels×7.7 lines/mm is received and converted into an image of 16 pels×15.4 lines/mm by doubling the resolution of the received image in both the main scanning and sub-scanning directions, and the resultant image data is output to the printer 10.

Upon reception of an incoming call through a communication line (not shown), the facsimile apparatus in FIG. 1 receives facsimile data through the communication unit 3. The received data is temporarily stored in the image memory 2. The data are sequentially decoded by the control unit 1 and stored again in the image memory 2. When 1-line image data is decoded and stored, the data is sent to the parallel/serial converter 5 to be converted into serial data. The black and white pixels of the serial data are inverted by the inverter 6. The inverted data is sent to the smoothing unit 7.

The smoothing unit 7 performs a known smoothing process of interpolating black pixels. The black and white pixels of the smoothed image data are inverted by the inverter 8. With this inversion, the image data is restored to its original state. The data is then converted into parallel data by the serial/parallel converter 9. The resultant data is sent to the printer 10 to be printed.

As described above, this facsimile apparatus uses the conventional smoothing algorithm for black pixel interpolation. The apparatus inverts the black and white pixels of image data before a smoothing process, and performs smoothing for the inverted image data. After the smoothing process, the apparatus inverts again the black and white pixels of the image data and prints the resultant image.

A smoothing process in the smoothing unit 7 will be described below.

The smoothing unit 7 can store inverted data sent from the inverter 6 by an amount corresponding to a plurality of lines.

The states of one target pixel and a plurality of adjacent pixels are discriminated. The target pixel is then divided into a plurality of sub-pixels in accordance with the discrimination result. It is then determined whether each of the divided sub-pixels is a white/black pixel.

In this embodiment, a target pixel is divided into four sub-pixels, as shown in FIG. 2. The arrangement of the four white/black sub-pixels is determined to smooth the contour portion of the image in accordance with the states of the 3×3 pixels centered on the target pixel.

FIGS. 3A to 3C are views each showing an example of the pattern of a 3×3 pixel matrix to which one or a plurality of black pixels are added by interpolation. Referring to each drawing, when the pattern of a given 3×3 pixel matrix coincides with the pattern on the left side, the arrangement of the white/black sub-pixels of the target pixel is determined as indicated on the right side.

The patterns for black pixel interpolation for a smoothing process are not limited to those shown in FIGS. 3A to 3D. For example, patterns obtained by rotating the patterns in FIGS. 3A and 3B through 90°, 180°, and 270° may be used.

A pattern obtained by rotating the pattern in FIG. 3C through 180° also may be used.

The pattern in FIG. 3D is a pattern which is not subjected to black pixel interpolation.

FIG. 4 shows how pixels are interpolated in the facsimile apparatus. Assume that a smoothing process is performed to convert image data having a resolution of 8 pels in the main scanning direction and a resolution of 7.7 lines/mm in the sub-scanning direction into image data having a resolution of 16 pels in the main scanning direction and a resolution of 15.4 lines/mm in the sub-scanning direction. In this case, with the smoothing process, the pixels indicated by the hatched portions are interpolated, so that an image 100 is converted into an image 200. From the viewpoint of data, the ragged portions of the image 200 are smoother than those of the image 100. That is, interpolation is performed to convert the contour into a smooth line.

If this method is applied to an ink-jet printer, however, since ink blurs on a printing paper sheet, the line becomes too thick, and an undesirable connection may be formed in the image. As a result, the image quality deteriorates. That is, no soothing effect can be obtained.

In this embodiment, since a smoothing process is performed after the black and white pixels of image data are inverted, interpolation processing is performed for image data corresponding to a white image in the original state. When the black and white pixels of the image data are inverted again after the smoothing process, the pixels indicated by "⊙" are converted into white pixels, as shown in FIG. 4. As a result, an image 300 having a smooth line can be obtained.

The above interpolation will be described in more detail below.

Figure 5:
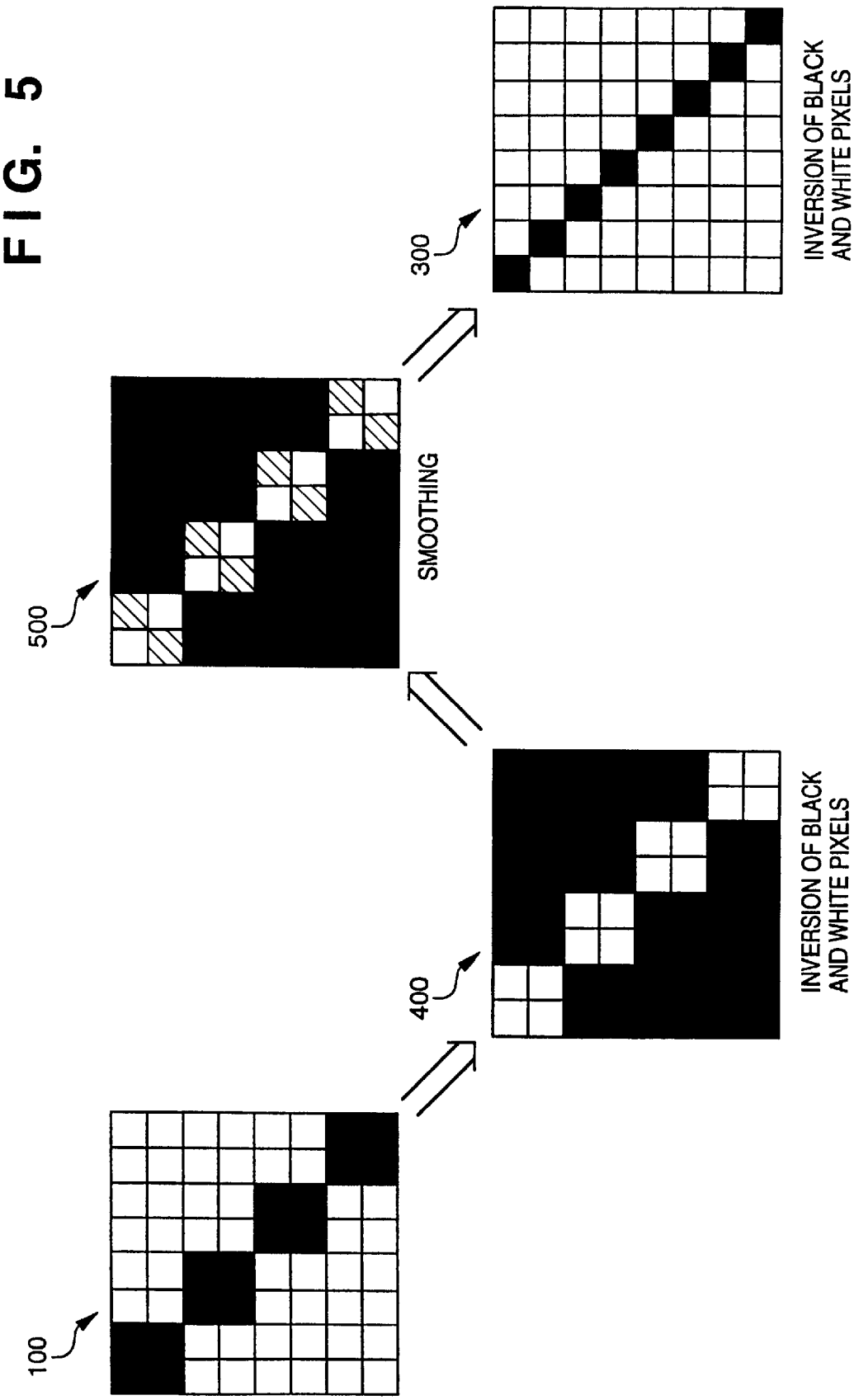
FIGS. 5 and 6 are views for explaining the steps in a smoothing process of interpolating white pixels in this embodiment.

FIG. 5 shows the concept of the process of converting an image 100 (identical to the image 100 in FIG. 4) into an image 300. When the black and white pixels of the image are inverted by the inverter 6, an image 400 is obtained. When this image is input to the smoothing unit 7, pixels are interpolated at the hatched portions in FIG. 5. As a result, an image 500 is obtained. When the black and white pixels of this image are inverted again by the inverter 8, the image 500 is converted into the image 300.

With the above process, the line becomes thin from the viewpoint of image data. In practice, however, when an ink-jet printer is used to print the image, since an ink blurs on a printing paper sheet, a character/line drawing having an optimal thickness can be obtained, and a beautiful image can be obtained as a whole.

In addition, the present invention can prevent an undesirable connection between thin lines as described above, and can also provide a good result with respect to a contour portion of an image.

Figure 6:
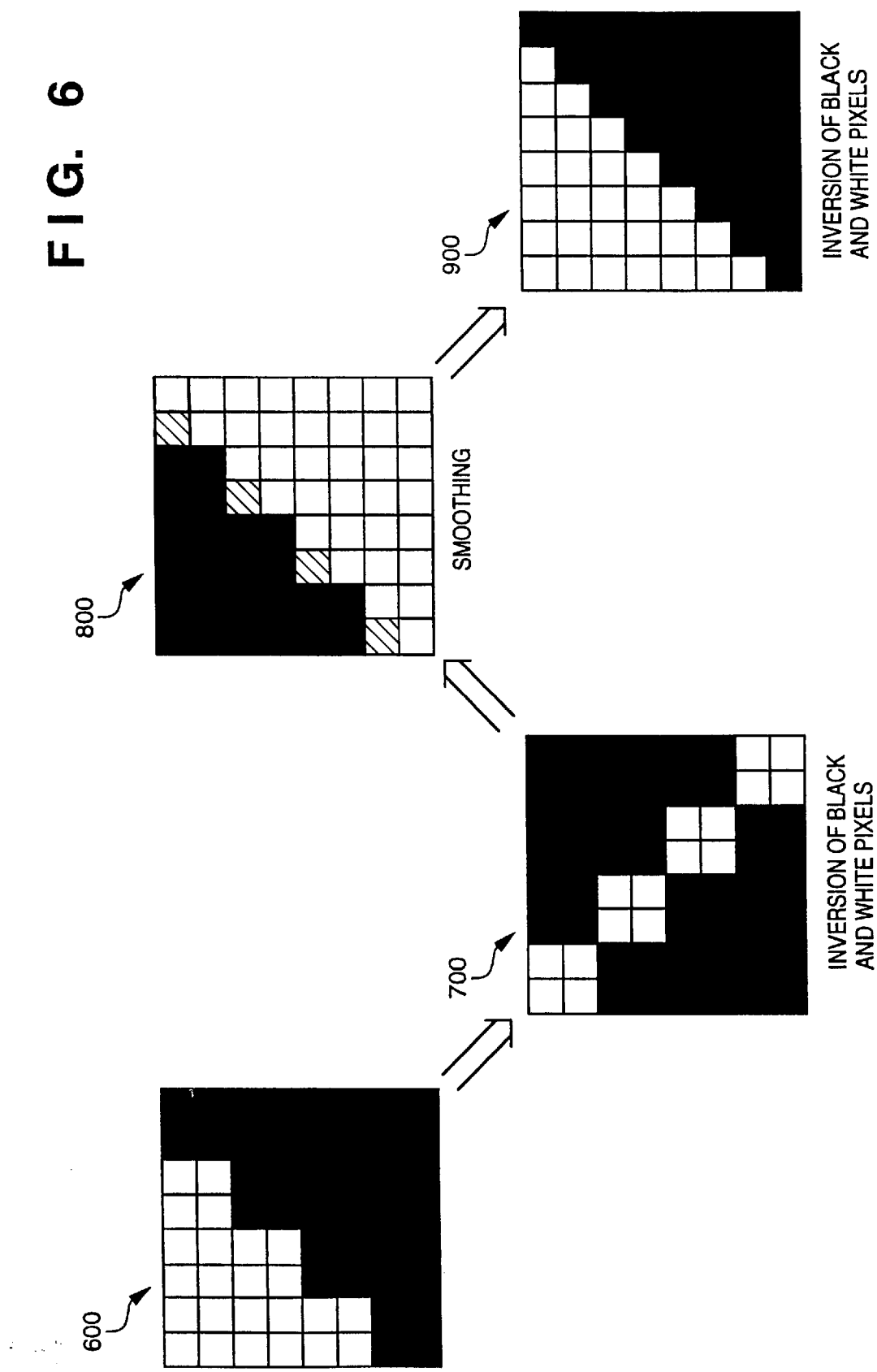

FIG. 6 is a view for explaining a smoothing process in this embodiment with respect to a contour portion of an image.

When the black and white pixels of an input image 600 are inverted by the inverter 6, an image 700 is obtained. When this image is input to the smoothing unit 7, the smoothing unit 7 interpolates black pixels at the hatched portions to obtain an image 800. The black and white pixels of this image are inverted again by the inverter 8 to obtain an image 900. When the images 600 and 900 in FIG. 6 are compared with each other, it is apparent that the black region becomes smaller than that of the original image 600, as in the case of the thin line in FIG. 5. However, since ink moderately blurs on a printing paper sheet, the black region of the printed image becomes almost equal in size to that of the original image, and a smooth contour can be obtained. At the same time, the consumption of ink can be suppressed by the amount corresponding to the decrease in an number of black pixels, and hence a reduction in running cost can be attained.

As described above, according to this embodiment, since a smoothing process is performed such that interpolation processing is performed for white pixels of an image, a beautiful facsimile image can be obtained by an ink-jet printer without forming an undesirable connection in the image.

In addition, since interpolation processing for white pixels decreases the number of black pixels, the consumption of ink can be decreased, and the running cost of the apparatus can be reduced.

Figure 7:
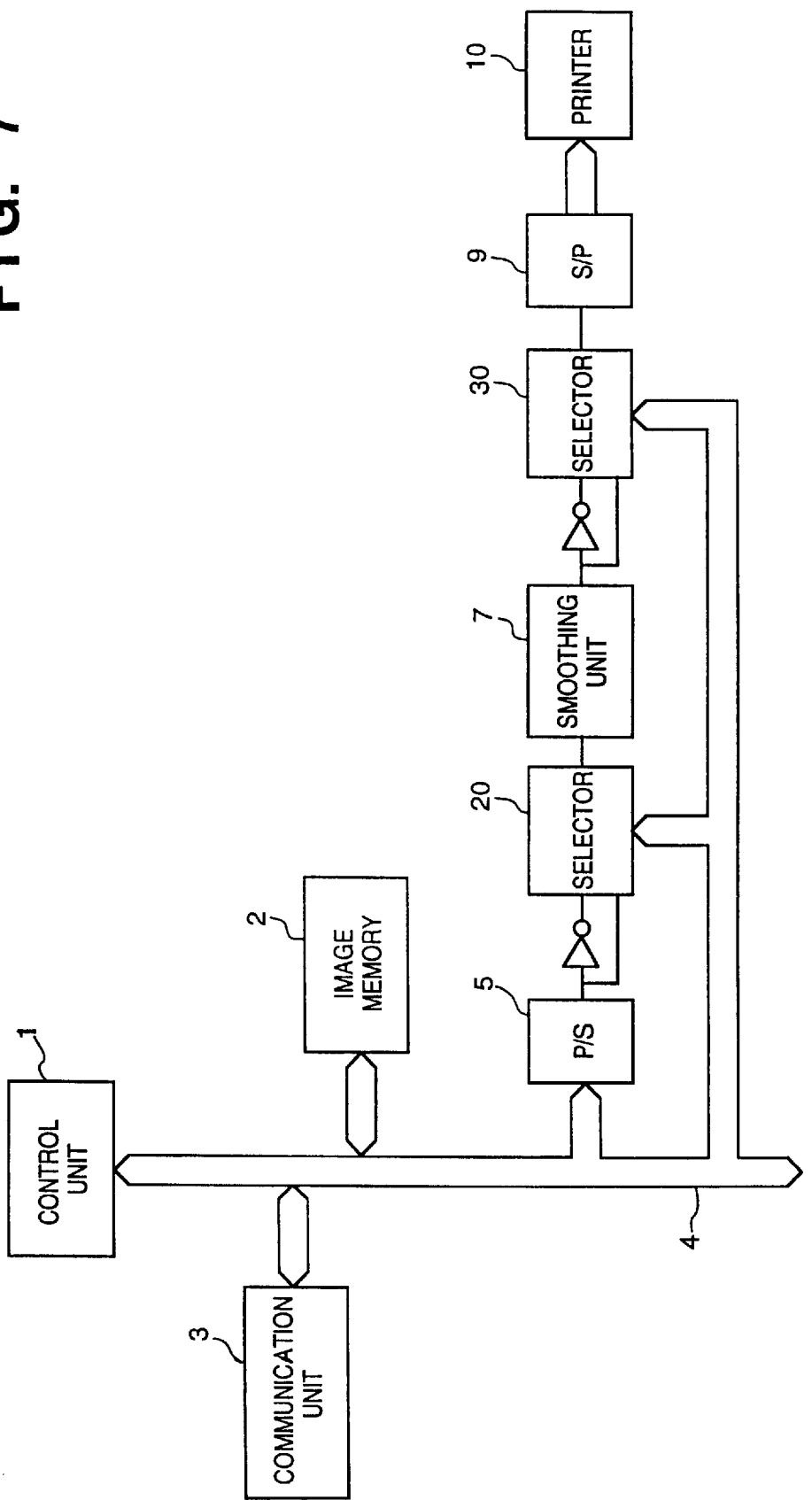
FIG. 7 is a block diagram showing the arrangement of an apparatus which can select interpolation of white pixels or interpolation of black pixels.

In the above embodiment, the ink and the printing paper sheet that cause blurring are used. If, however, an ink and a printing paper sheet that cause little blurring are to be used, input data may be directly input to the smoothing unit 7 without inverting the black and white pixels, and the output from the smoothing unit 7 may be directly input to the serial/parallel converter 9. FIG. 7 shows an arrangement for such an operation.

Referring to FIG. 7, selectors 20 and 30 are controlled in accordance with selection through an operation unit (not shown) in the following manner. When an ink and a printing paper sheet that cause much blurring are to be used, the selector 20 operates to invert the black and white pixels of input data and input the inverted data to the smoothing unit 7, and the selector 30 selects the inverted data from the smoothing unit 7. When an ink and a printing paper sheet that cause little blurring are to be used, the selector 20 operates to input input image to the smoothing unit 7 without inverting the black and white pixels, and the selector 30 selects the non-inverted data from the smoothing unit 7.

With this operation, the single smoothing unit 7 can be used to perform both a smoothing process for a case wherein ink blurs little and a smoothing process for a case wherein ink blurs much.

In addition, this selecting operation of the selectors 20 and 30 may be controlled in accordance with the type of a printer.

In this case, if the printer is a laser beam printer, input data is input to the smoothing unit 7 without inverting the black and white pixels. If the printer is an ink-jet printer, the black and white pixels of input data are inverted, and the inverted image is input to the smoothing unit 7.

As described above, in this apparatus, a smoothing process is performed after the black and white pixels of image data are inverted, and the black and white pixels of the image data are inverted again after the smoothing process, thus allowing the use of the conventional smoothing algorithm for black pixel interpolation. Therefor, no special arrangement for white pixel interpolation is required, attaining a reduction in cost. In addition, if the apparatus is designed to allow insertion of image data black and white pixel inversion mechanisms before and after the smoothing unit, the smoothing unit is compatible with any type of printer.

In the above embodiment, the received image of 8 pels× 7.7 lines/mm is converted into an image whose resolution is twice that of the received image in the main scanning and sub-scanning directions. However, the present invention is not limited to this. For example, a received image of 8 pels×3.85 lines/mm may be converted into an image having a resolution twice that of the received image in the main scanning direction and a resolution four times that of the received image in the sub-scanning direction. If the resolution of the printer is 350 dpi×360 dpi (14 pels×14.2 lines/mm), thinning processing may be performed at a predetermined ratio after the resolution is converted into 16 pels× 15.4 lines/mm.

Note that the present invention may be applied to either a system constituted by a plurality of devices (e.g., a host computer, an interface device, and a reader, a printer), or an apparatus consisting of a single device (e.g., a copying machine or a facsimile apparatus).

The objects of the present invention are also achieved by supplying a storage medium, which records program codes of a software program that can realize the functions of the above-mentioned embodiments to the system or apparatus, and reading out and executing the program codes stored in the storage medium by a computer (or a CPU or MPU) of the system or apparatus. In this case, the program codes themselves read out from the storage medium realize the functions of the abovementioned embodiments, and the storage medium which stores the program codes constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiment may be realized not only by executing the readout program codes by the computer but also by some or all of actual processing operations executed by an OS (operating system) running on the computer on the basis of instructions of the program codes.

Furthermore, the functions of the above-mentioned embodiments may be realized by some or all of actual processing operations executed by a CPU or the like arranged in a function expansion board or a function expansion unit, which is inserted in or connected to the computer and receives the program codes read out from the storage medium.

As has been described above, according to this embodiment, by performing a smoothing process to interpolate white pixels, a high-quality facsimile image can be obtained without forming an undesirable connection in the image as compared with the image obtained by black pixel interpolation.

In addition, since a smoothing process is performed for image data after its black and white pixels are inverted, and the black and white pixels of the image are inverted again after the smoothing process, the conventional smoothing algorithm for black pixel interpolation can be used. A smoothing process for white pixel interpolation can be realized with a simple arrangement.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising input means for inputting image data having a plurality of pixels, each pixel representing white and black; and processing means for performing a smoothing process for the image data to convert the input data into image data having a higher resolution than the input image data, wherein said processing means performs the smoothing process by performing interpolation processing for white pixels of the input image data, and wherein said processing means also inverts black and white pixels of the input image, performs a smoothing process of interpolating black pixels with respect to the inverted image, and inverts black and white pixels of the smoothed image again.

2. The apparatus according to claim 1, wherein said input means inputs a facsimile image.

3. The apparatus according to claim 1, further comprising output means for outputting the image smoothed by said processing means.

4. The apparatus according to claim 3, wherein said output means prints an image by an ink-jet printing scheme.

5. The apparatus according to claim 1, further comprising second selection means for selecting, as an output from said processing means, image data whose black and white pixels are inverted or image data whose black and white pixels are not inverted.

6. An image processing apparatus comprising:

input means for inputting image data having a plurality of pixels, each pixel representing white and black;

first inverting means for inverting black and white pixels of the input image data;

smoothing means for performing a smoothing process for the image data inverted by said first inverting means; and second inverting means for inverting the black and white pixels of the image data smoothed by said smoothing means.

7. The apparatus according to claim 6, wherein said input means inputs a facsimile image.

8. The apparatus according to claim 6, further comprising output means for outputting the image whose black and white pixels are inverted by said second inverting means.

9. The apparatus according to claim 8, wherein said output means prints an image by an ink-jet printing scheme.

10. The apparatus according to claim 6, wherein said processing means comprises first selection means for selecting one of image data and image data obtained by inverting black and white pixels of the image data, as an input to said processing means.

11. The apparatus according to claim 10, further comprising second selection means for selecting, as an output from said smoothing means, image data whose black and white pixels are inverted or image data whose black and white pixels are not inverted.

12. An image processing method comprising:

an input step of inputting image data having a plurality of pixels, each pixel representing white and black; and a processing step of performing a smoothing process for the image data to convert the input data into image data having a higher resolution than the input image data, wherein the processing step includes performing the smoothing process by performing interpolation processing for white pixels of the input image data, and wherein the processing step also includes inverting black and white pixels of the input image, performing a smoothing process of interpolating black pixels with respect to the inverted image, and inverting black and white pixels of the smoothed image again.

13. The method according to claim 12, wherein the input step includes inputting a facsimile image.

14. The method according to claim 12, further comprising an output step of outputting the image smoothed in the processing step.

15. The method according to claim 14, wherein the output step includes printing an image by an ink-jet printing scheme.

* * * * *

UNITED STATES PATENT AND TRADEMARK OFFICE
CERTIFICATE OF CORRECTION

PATENT NO. : 6,061,151
DATED : May 9, 2000
INVENTOR(S) : Takashi Oho

It is certified that error appears in the above-identified patent and that said Letters Patent is hereby corrected as shown below:

Column 1,
Line 23, "an" should be deleted;
Line 57, "again" (second occurrence) should be deleted.

Column 4,
Line 50, "the" (first occurrence)" should read -- an -- and, "an" should read -- the --.

Signed and Sealed this

Sixteenth Day of October, 2001

Attest:

NICHOLAS P. GODICI
Attesting Officer  Acting Director of the United States Patent and Trademark Office